United States Patent [19]

Sugitani et al.

[11] Patent Number: 4,517,438

[45] Date of Patent: May 14, 1985

[54] ROTARY ARC-WELDING APPARATUS

[75] Inventors: Yuji Sugitani; Yukio Kobayashi, both of Tsu, Japan

[73] Assignee: Nippon Kokan Kabushiki Kaisha, Tokyo, Japan

[21] Appl. No.: 535,887

[22] Filed: Sep. 26, 1983

[51] Int. Cl.³ .............................................. B23K 9/28
[52] U.S. Cl. .............................. 219/125.12; 219/136; 219/137.2; 339/8 R
[58] Field of Search ................ 219/125.12, 136, 137.2; 339/6 R, 8 R

[56] References Cited

U.S. PATENT DOCUMENTS

| | | | |
|---|---|---|---|
| 3,559,145 | 1/1971 | Spencer | 339/8 R |
| 3,609,628 | 9/1971 | Cabaussel | 339/3 |
| 4,336,974 | 6/1982 | Wilson | 339/8 R |
| 4,401,878 | 8/1983 | Roen | 219/137.31 |
| 4,419,563 | 12/1983 | Nomura et al. | 219/125.12 |

FOREIGN PATENT DOCUMENTS

| | | | |
|---|---|---|---|
| 55-133871 | 10/1980 | Japan . | |
| 1505732 | 3/1978 | United Kingdom | 219/125.12 |

Primary Examiner—Roy N. Envall, Jr.
Assistant Examiner—Alfred S. Keve
Attorney, Agent, or Firm—Frishauf, Holtz, Goodman & Woodward

[57] ABSTRACT

A rotary arc-welding apparatus which comprises: a rotatable nozzle having in its interior thereof a passage for directing a consumable welding electrode eccentrically from the center axis of the nozzle toward a groove formed between objects of welding; a consumable welding electrode feeding mechanism for continuously directing the consumable welding electrode toward the groove through the nozzle; a welding current feeding mechanism for feeding a welding current to the nozzle, which comprises a current receiving plate fixed to the top end of the nozzle, a brush having on the upper surface thereof a current feeding plate, the brush and the current receiving plate having a flat contact interface therebetween, a plurality of rods for stationarily holding the brush and the current feeding plate, and a plurality of springs for applying a pressure onto the contact interface between the brush and the current receiving plate; a nozzle rotating mechanism for rotating the nozzle about the center axis thereof at a high speed to cause a circular movement of an arc from the tip of the consumable welding electrode corresponding to the eccentricity thereof; and a shielding gas feeding mechanism for feeding a shielding gas toward the arc and a weld zone.

1 Claim, 5 Drawing Figures

ROTARY ARC-WELDING APPARATUS

A prior art document pertinent to the present invention is Japanese Pat. Provisional Publication No. 133871/80 dated Oct. 18, 1980.

The contents of the above-mentioned prior art document will be described hereafter under the heading of the "BACKGROUND OF THE INVENTION".

FIELD OF THE INVENTION

The present invention relates to a rotary arc-welding apparatus for welding objects to be welded (hereinafter referred to as "objects of welding") while causing a circular movement of an arc from the tip of a consumable welding electrode directed through a nozzle toward a groove formed between the objects of welding by rotating the nozzle about the center axis thereof at a high speed.

BACKGROUND OF THE INVENTION

As a method which permits efficient welding of objects of welding such as thick steel plates with uniform penetration of molten metal without causing welding defects, there is disclosed in Japanese Pat. Provisional Publication No. 133,871/80 an arc-welding method of a narrow groove, which comprises:

directing a nozzle rotatable about the center axis thereof substantially vertically toward an I-shaped narrow groove formed between objects of welding; directing a consumable welding electrode through said nozzle eccentrically from the center axis of said nozzle toward said groove; feeding a welding current to said consumable welding electrode to produce an arc between said groove and the tip of said consumable welding electrode to weld said objects of welding with each other by means of heat from said arc; rotating said nozzle about the center axis thereof at a high speed of at least 120 r.p.m. to cause a circular movement of said arc from the tip of said consumable welding electrode corresponding to the eccentricity thereof; and feeding a shielding gas toward said arc and a weld zone to shield said arc and said weld zone from the open air (hereinafter referred to as the "prior art").

In the prior art described above, the welding current is fed to the consumable welding electrode by a welding current feeding mechanism provided on the tip portion of the nozzle or on a consumable welding electrode feeding mechanism located above the nozzle. However, the welding current feeding mechanism, if provided on the lower end portion of the nozzle, would be required to have a complicated construction because of the high-speed rotation of the nozzle and may be damaged by the arc heat or spatters produced during welding. Furthermore, when the groove width is very small, the welding current feeding mechanism may make it difficult to insert the nozzle into the groove. When the welding current feeding mechanism is provided on the consumable welding electrode feeding mechanism located above the nozzle, on the other hand, the considerable length of the consumable welding electrode between the tip thereof and the consumable welding electrode feeding mechanism leads to a larger electric resistance of the consumable welding electrode, thus resulting in a larger loss of the welding current.

Under such circumstances, there is a strong demand for the devclopment of a rotary arc-welding apparatus which permits sure feeding of a welding current by a simple welding current feeding mechanism to a nozzle rotating about the center axis thereof at a high speed, without causing damages to the welding current feeding mechanism by the arc heat or spatters produced during welding, and gives only a small loss of the welding current, and furthermore, has a welding current feeding mechanism not hindering insertion of the nozzle into the groove even when the groove width is small, but such an apparatus is not as yet proposed.

SUMMARY OF THE INVENTION

An object of the present invention is therefore to provide, when welding objects of welding while causing a circular movement of an arc from the tip of a consumable welding electrode directed through a nozzle toward a groove formed between the objects of welding by rotating the nozzle about the center axis thereof at a high-speed, a rotary arc-welding apparatus which permits sure feeding of a welding current to the nozzle by a simple welding current feeding mechanism, without causing damages to the welding current feeding mechanism by the arc heat or spatters produced during welding, and gives only a small loss of the welding current.

Another object of the present invention is to provide, when welding objects of welding while causing a circular movement of an arc from the tip of a consumable welding electrode directed through a nozzle toward a narrow groove formed between the objects of welding by rotating the nozzle about the center axis thereof at a high speed, a rotary arc-welding apparatus which has a welding current feeding mechanism not hindering insertion of the nozzle into the narrow groove.

In accordance with one of the features of the present invention, there is provided a rotary arc-welding apparatus which comprises:

a nozzle rotatable about the center axis thereof at a high speed, said nozzle having in the interior thereof a passage for directing a consumable welding electrode eccentrically from the center axis of said nozzle toward a groove formed between objects of welding;

a consumable welding electrode feeding mechanism, provided above said nozzle, for continuously directing said consumable welding electrode toward said groove through said nozzle;

a welding current feeding mechanism for feeding a welding current to said nozzle to produce an arc between said groove and the tip of said consumable welding electrode passing through said nozzle;

a nozzle rotating mechanism for rotating said nozzle about the center axis thereof at a high speed to cause a circular movement of said arc from the tip of said consumable welding electrode corresponding to the eccentricity thereof, said nozzle rotating mechanism comprising a motor fixed to a carriage, gears for transmitting the rotation of said motor to said nozzle, and a gear box for housing said gears, said gear box rotatably supporting said nozzle passing therethrough; and a shielding gas feeding mechanism for feeding a shielding gas toward said arc and a weld zone to shield said arc and said weld zone from the open air;

characterized in that:

said welding current feeding mechanism (8) comprises:

a circular current receiving plate (9), which is fixed to the upper end of said nozzle (1) and rotates together with said nozzle (1), said current receiving plate (9)

having at the center thereof a passage (10) for said consumable welding electrode (4);

a circular brush (11), having substantially the same diameter as that of said current receiving plate (9), for feeding said welding current to said current receiving plate (9), said brush (11) having on the upper surface thereof a current feeding plate (13), the lower surface of said brush (11) and the upper surface of said current receiving plate (9) having a flat contact interface (12) therebetween, and said brush (11) and said current feeding plate (13) having at the center thereof a passage (23) for said consumable welding electrode (4);

a plurality of rods (19) for stationarily holding said brush (11) and said current feeding plate (13) so as to prevent same from rotating together with said nozzle (1) and said current receiving plate (9), the lower halves of said plurality of rods (19) being inserted into said brush (11) and said current feeding plate (13), and the upper end portions of said plurality of rods (19) being secured to a supporting plate (21) fixed to said carriage;

a plurality of springs (22) for applying a pressure onto said contact interface (12) between the lower surface of said brush (11) and the upper surface of said current receiving plate (9), said plurality of springs (22) being provided between said supporting plate (21) and said current feeding plate (13); and said pressure applied by said plurality of springs (22) onto said contact interface (12) between the lower surface of said brush (11) and the upper surface of said current receiving plate (9) being such that, when actuating said nozzle rotating mechanism (5), said nozzle (1) and said current receiving plate (9) rotate whereas said brush (11) and said current feeding plate (13) do not rotate, and said welding current smoothly flows from said brush (11) to said current receiving plate (9).

DETAILED DESCRIPTION OF PREFERRED EMBODIMENTS

From the aforementioned point of view, the present inventors carried out extensive studies to develop a rotary arc-welding apparatus which permits sure feeding of a welding current by a simple welding current feeding mechanism to a nozzle rotating about the center axis thereof at a high speed, without causing damages to the welding current feeding mechanism by the arc heat or spatters produced during welding, and gives only a small loss of the welding current, and furthermore, has a welding current feeding mechanism not hindering insertion of the nozzle into the groove even when the groove width is small.

As a result, we found that it is possible to solve the above-mentioned problems by adopting a welding current feeding mechanism for feeding a welding current to a nozzle which comprises: a current receiving plate fixed to the upper end of the nozzle and rotating together with the nozzle, and a brush having on the upper surface thereof a current feeding plate, and stationarily held so as not to rotate together with the nozzle and the current receiving plate, for feeding the welding current to the current receiving plate.

The present invention was made on the basis of the above-mentioned finding, and the rotary arc-welding apparatus of the present invention is described below with reference to the drawings.

Figure 1:
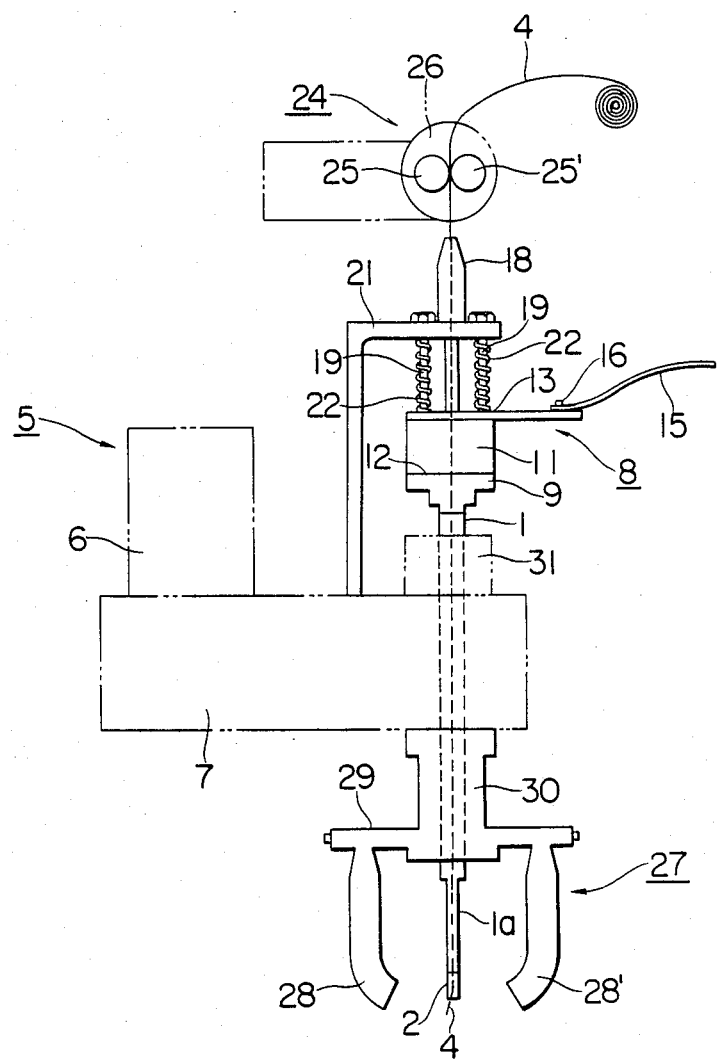
FIG. 1 is a schematic front view illustrating an embodiment of the apparatus of the present invention.
Figures 3A, 3B, 3C:
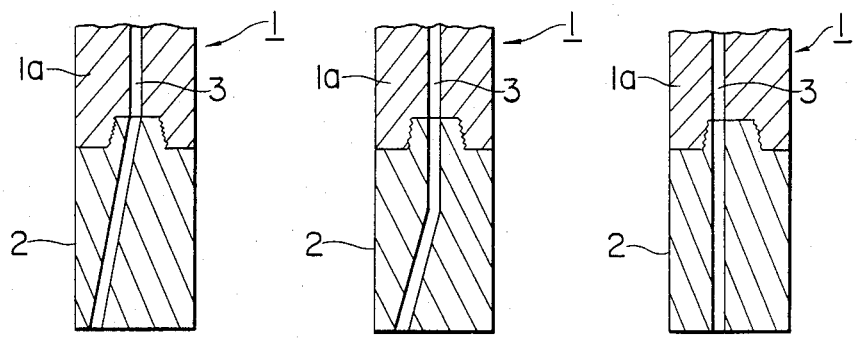
FIG. 3(a) is an enlarged longitudinal sectional view illustrating an embodiment of the lower end portion of the nozzle which nozzle is one of the components of the apparatus of the present invention.
FIG. 3(b) is an enlarged longitudinal sectional view illustrating another embodiment of the lower end portion of the nozzle which nozzle is one of the components of the apparatus of the present invention.
FIG. 3(c) is an enlarged longitudinal sectional view illustrating further another embodiment of the lower end portion of the nozzle which nozzle is one of the components of the apparatus of the present invention.

As shown in FIG. 1, a nozzle 1 rotatable about the center axis thereof at a high speed has in the interior thereof a passage 3 for directing a consumable welding electrode 4 eccentrically from the center axis of the nozzle 1 toward a groove formed between objects of welding. The lower end portion 1a of the nozzle 1 has a diameter smaller than that of the other portion thereof, and a tip member 2 is replaceably fitted to the lower end of the nozzle 1. As shown in FIGS. 3(a) and 3(b), the passage 3, provided through the nozzle 1 and the tip member 2, for directing the consumable welding electrode 4 may be eccentric from the center axis of the nozzle 1 at the tip member 2, or as shown in FIG. 3(c), may be eccentric from the center axis of the nozzle 1 throughout the entire passage 3 of the nozzle 1 and the tip member 2.

In FIG. 1, a nozzle rotating mechanism 5 comprises a motor 6 fixed to a carriage (not shown), gears (not shown) for transmitting the rotation of the motor 6 to the nozzle 1, and a gear box 7 for housing the gears. The gear box 7 supports the nozzle 1 passing through the gear box 7 through an insulator (not shown) rotatably about the center axis of the nozzle 1.

A welding current feeding mechanism 8 is provided at the upper end of the nozzle 1, for feeding a welding current to the nozzle 1 to produce an arc between the tip of the consumable welding electrode 4 passing through the nozzle 1 and the groove formed between the objects of welding. Now, the welding current feeding mechanism 8 is described with reference to FIGS. 1 and 2. A circular current receiving plate 9 is secured for example by driving to the upper end of the nozzle 1. The current receiving plate 9 has at the center thereof a passage 10 for the consumable welding electrode 4.

Figure 2:
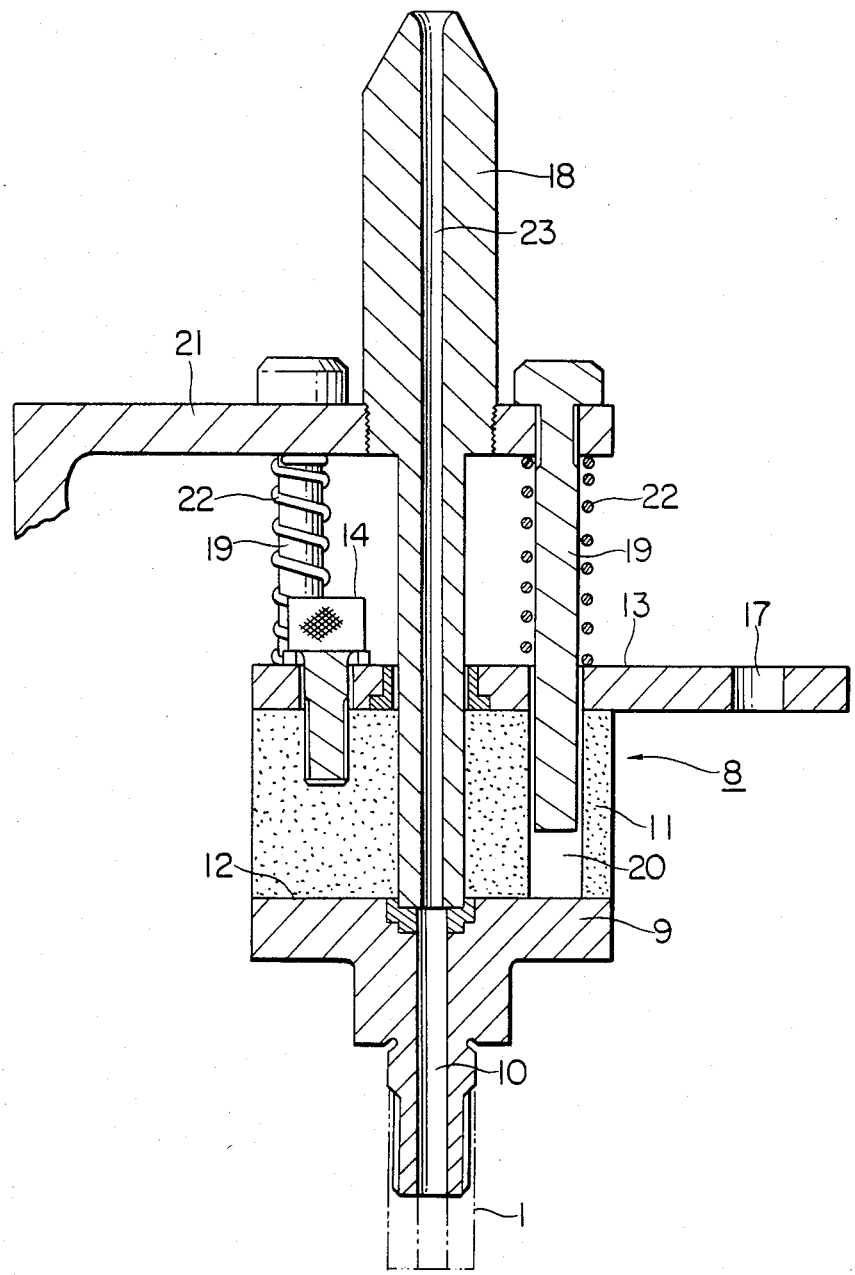
FIG. 2 is an enlarged longitudinal sectional view illustrating an embodiment of the welding current feeding mechanism which is one of the components of the apparatus of the present invention.

A circular carbonaceous brush 11, which has a diameter substantially equal to that of the current receiving plate 9, for feeding the welding current to the current receiving plate 9, is provided on the upper surface of the current receiving plate 9. The lower surface of the brush 11 and the upper surface of the current receiving plate 9 have a flat contact interface 12 therebetween. A current feeding plate 13 having a diameter substantially equal to that of the brush 11 is secured by means of a plurality of bolts 14 onto the upper surface of the brush 11. The current feeding plate 13 is connected with the end of a cable 15 connected to an electric power source (not shown) with a terminal 16. In FIG. 2, 17 is a terminal fitting bore provided in the current feeding plate 13. A guide pipe 18 described later, which serves as the passage for the consumable welding electrode 4, is provided through the brush 11 and the current feeding plate 13 at their centers.

The lower halves of a plurality of rods 19 for stationarily holding the brush 11 and the current feeding plate 13 are inserted into a plurality of holes 20 provided in the brush 11 and the current feeding plate 13 so as not to rotate together with the nozzle 1 and the current receiving plate 9. The upper end portions of the plurality of rods 19 are secured for example by driving to a supporting plate 21 fixed to the carriage. A plurality of coil-shaped springs 22 for applying a pressure onto the contact interface 12 between the lower surface of the brush 11 and the upper surface of the current receiving plate 9 are provided between the supporting plate 21 and the current feeding plate 13. The plurality of rods 19 are inserted into the plurality of coil-shaped springs 22. The pressure applied by the plurality of springs 22 onto the contact interface 12 between the lower surface of the brush 11 and the upper surface of the current receiving plate 9 is such that, when the nozzle rotating mechanism 5 is actuated, the nozzle 1 and the current receiving plate 9 rotate whereas the brush 11 and the current feeding plate 13 do not rotate, and the welding current smoothly flows from the brush 11 to the current receiving plate 9.

The middle portion of the guide pipe 18 having in the interior thereof a passage 23 for directing the consumable welding electrode 4 toward the nozzle 1 is secured to the supporting plate 21 for example by driving. The lower half of the guide pipe 18 passes through the current feeding plate 13 and the brush 11, and the passage 23 provided in the guide pipe 18 communicates with the passage 10 provided in the current receiving plate 9.

As shown in FIG. 1, a consumable welding electrode feeding mechanism 24 for continuously directing the consumable welding electrode 4 toward the groove formed between the objects of welding is provided above the guide pipe 18. The consumable welding electrode feeding mechanism 24 comprises a pair of rollers 25 and 25' and a motor 26 for rotating the pair of rollers 25 and 25'. The consumable welding electrode 4 is continuously directed toward the above-mentioned groove through the passage 23 in the guide pipe 18, the passage 10 in the current receiving plate 9 and the nozzle 1, by means of the pair of rollers 25 and 25' driven by the motor 26.

A shielding gas feeding mechanism 27 for feeding a shielding gas toward the arc produced between the tip of the consumable welding electrode 4 passing through the nozzle 1 and the above-mentioned groove and a weld zone to shield the arc and the weld zone from the open air is provided on the lower surface of the gear box 7. The shielding gas feeding mechanism 27 comprises a pair of opposing gas nozzles 28 and 28' which eject a shielding gas toward the arc and the weld zone and a substantially horizontal gas nozzle support 29 for securing the pair of gas nozzles at a predetermined position. The nozzle support 29 is fitted to the lower surface of the gear box 7 by means of a fitting piece 30. The nozzle 1 passes, through an insulator (not shown), through the nozzle support 29 and the fitting piece 30 at the center portions thereof. In FIG. 1, 31 is a detector for detecting the deviation of the tip of the consumable welding electrode 4, which projects from the lower end of the nozzle 1 and rotates, from the center line of the groove.

By means of the rotary arc-welding apparatus of the present invention having the construction as described above, welding of the objects of welding is conducted as follows. The nozzle 1 is directed toward the groove formed between the objects of welding, and the consumable welding electrode 4 is directed by the consumable welding electrode feeding mechanism 24, through the nozzle 1, eccentrically from the center axis of the nozzle 1 toward the groove. The nozzle 1 is rotated about the center axis thereof at a high speed by the nozzle rotating mechanism 5, and a welding current is fed to the nozzle 1 by the welding current feeding mechanism 8 provided at the upper end portion of the nozzle 1. As a result, an arc is produced between the tip of the consumable welding electrode 4 directed toward the groove eccentrically from the center axis of the nozzle 1 and the groove, and the arc shows a circular movement corresponding to the eccentricity mentioned above caused by the rotation of the nozzle 1. The shielding gas is fed by the shielding gas feeding mechanism 27 toward the arc and the weld zone to shield the arc and the weld zone from the open air. Thus, the objects of welding are efficiently welded with each other without the occurrence of welding defects caused by the heat of the rotating arc as mentioned above.

In the rotary arc-welding apparatus of the present invention, the welding current feeding mechanism 8 for feeding the welding current to the nozzle 1 comprises, as described above, the current receiving plate 9 fixed to the upper end of the nozzle 1, the brush 11 having on the upper surface thereof the current feeding plate 13, the lower surface of the brush 11 and the upper surface of the current receiving plate 9 having the flat contact interface 12 therebetween, the plurality of rods 19 for stationarily holding the brush 11 and the current feeding plate 13, and the plurality of springs 22 for applying a pressure onto the contact interface 12 between the lower surface of the brush 11 and the upper surface of the current receiving plate 9 in such a manner that the nozzle 1 and the current receiving plate 9 rotate whereas the brush 11 and the current feeding plate 13 do not rotate and the welding current smoothly flows from the brush 11 to the current receiving plate 9.

It is therefore possible to ensure feeding of the welding current to the nozzle 1 rotating at a high speed by a simple construction without disturbing the rotation of the nozzle 1. The welding current feeding mechanism 8, being provided at the upper end of the nozzle 1, is not damaged by the arc heat or spatters produced during welding, and does not hinder, even when welding the objects of welding along a narrow groove, the insertion of the nozzle 1 into the groove. In addition, since the welding current flows through a shorter length of the consumable welding electrode than in the case of the welding current feeding mechanism provided on the consumable welding electrode feeding mechanism 24, the electric resistance of the consumable welding electrode 4 is smaller, thus resulting in a relatively small loss of welding current.

According to the rotary arc-welding apparatus of the present invention, as described above in detail, it is possible, when welding objects of welding while causing a circular movement of an arc from the tip of a consumable welding electrode directed through a nozzle toward a groove formed between the objects of welding by rotating the nozzle about the center axis thereof at a high speed, to ensure feeding of a welding current to the nozzle by a simple welding current feeding mechanism without damages to the welding current feeding mechanism by the arc heat or spatters produced during welding, to give only a small loss of the welding current, and furthermore, to prevent the welding current feeding mechanism from hindering the insertion of the nozzle into the groove even when the groove width is small, thus providing industrially useful effects.

What is claimed is:

1. A rotary arc-welding apparatus which comprises:
   a nozzle rotatable about the center axis thereof at a high speed, said nozzle having in the interior thereof a passage for directing a consumable welding electrode eccentrically from the center axis of said nozzle toward a groove formed between objects of welding;
   a consumable welding electrode feeding mechanism, provided above said nozzle, for continuously directing said consumable welding electrode toward said groove through said nozzle;
   a welding current feeding mechanism for feeding a welding current to said nozzle to produce an arc between said groove and the tip of said consumable welding electrode passing through said nozzle;
   a nozzle rotating mechanism for rotating said nozzle about the center axis thereof at a high speed to cause a circular movement of said arc from the tip of said consumable welding electrode corresponding to the eccentricity thereof, said nozzle rotating mechanism comprising a motor fixed to a carriage, gears for transmitting the rotation of said motor to said nozzle, and a gear box for housing said gears, said gear box rotatably supporting said nozzle passing therethrough; and
   a shielding gas feeding mechanism for feeding a shielding gas toward said arc and a weld zone to shield said arc and said weld zone from the open air;
   characterized in that:
   said welding current feeding mechanism (8) comprises:
   a circular current receiving plate (9), which is fixed to the upper end of said nozzle (1) and rotates together with said nozzle (1) about said center axis, said current receiving plate (9) having at the center thereof a passage (10) for said consumable welding electrode (4);
   a circular brush (11), having substantially the same diameter as that of said current receiving plate (9), for feeding said welding current to said current receiving plate (9), said brush (11) having on the upper surface thereof a current feeding plate (13), the lower surface of said brush (11) and the upper surface of said current receiving plate (9) having a flat contact interface (12) therebetween, and said brush (11) and said current feeding plate (13) having at the center thereof a passage (23) for said consumable welding electrode (4);
   a plurality of rods (19) for stationarily holding said brush (11) and said current feeding plate (13) so as to prevent same from rotating together with said nozzle (1) and said current receiving plate (9), the lower halves of said plurality of rods (19) being inserted into said brush (11) and said current feeding plate (13), and the upper end portions of said plurality of rods (19) being secured to a supporting plate (21) fixed to said carriage;
   a plurality of springs (22) for applying a pressure onto said contact interface (12) between the lower surface of said brush (11) and the upper surface of said current receiving plate (9), said plurality of springs (22) being provided between said supporting plate (21) and said current feeding plate (13); and,
   said pressure applied by said plurality of springs (22) onto said contact interface (12) between the lower surface of said brush (11) and the upper surface of said current receiving plate (9) being such that, when actuating said nozzle rotating mechanism (5), said nozzle (1) and said current receiving plate (9) rotate whereas said brush (11) and said current feeding plate (13) do not rotate, and said welding current smoothly flows from said brush (11) to said current receiving plate (9).

* * * * *